(12) United States Patent
Miyamoto

(10) Patent No.: US 6,454,252 B2
(45) Date of Patent: Sep. 24, 2002

(54) AUTOMOTIVE VIBRATION ISOLATING DEVICE

(75) Inventor: Yasuo Miyamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/909,799

(22) Filed: Jul. 23, 2001

(30) Foreign Application Priority Data

Aug. 1, 2000 (JP) ........................................ 2000-233481

(51) Int. Cl.$^7$ .............................. F16F 7/00; B60G 13/00
(52) U.S. Cl. ..................... 267/219; 267/279; 267/293; 267/140.12
(58) Field of Search ...................... 267/140.11–140.15, 267/281, 279, 293, 219, 220, 152, 153, 280, 292, 141; 248/636; 180/300, 312, 902, 68.4, 784; 280/124.129, 124.177, 124.109, 124.108, 124.148, 5.52, 5.516

(56) References Cited

U.S. PATENT DOCUMENTS 4,203,499 A * 5/1980 Miyata
4,630,806 A * 12/1986 Dan et al. .............. 267/140.12
4,717,175 A * 1/1988 Arai et al.
5,287,940 A * 2/1994 Ogawa et al. .............. 248/636
5,685,556 A * 11/1997 Shibue et al.
6,007,072 A * 12/1999 Yoon ..................... 267/140.12

FOREIGN PATENT DOCUMENTS

JP          63263134    * 10/1988
JP          2-31927     * 2/1990

* cited by examiner

Primary Examiner—Douglas C. Butler
(74) Attorney, Agent, or Firm—Armstrong, Westerman & Hattori, LLP

(57) ABSTRACT

There is provided a difference in dynamic characteristics between one and the other of vibration isolating rubber members which are provided as a pair on left and right sides of an automotive vehicle. This causes a difference δ in phase between vibrations transmitted via the left and right vibration isolating rubber members, and vibrations from the left and right vibration isolating rubber members cancel each other, whereby the vibration of the body of the automotive vehicle can be reduced.

5 Claims, 6 Drawing Sheets

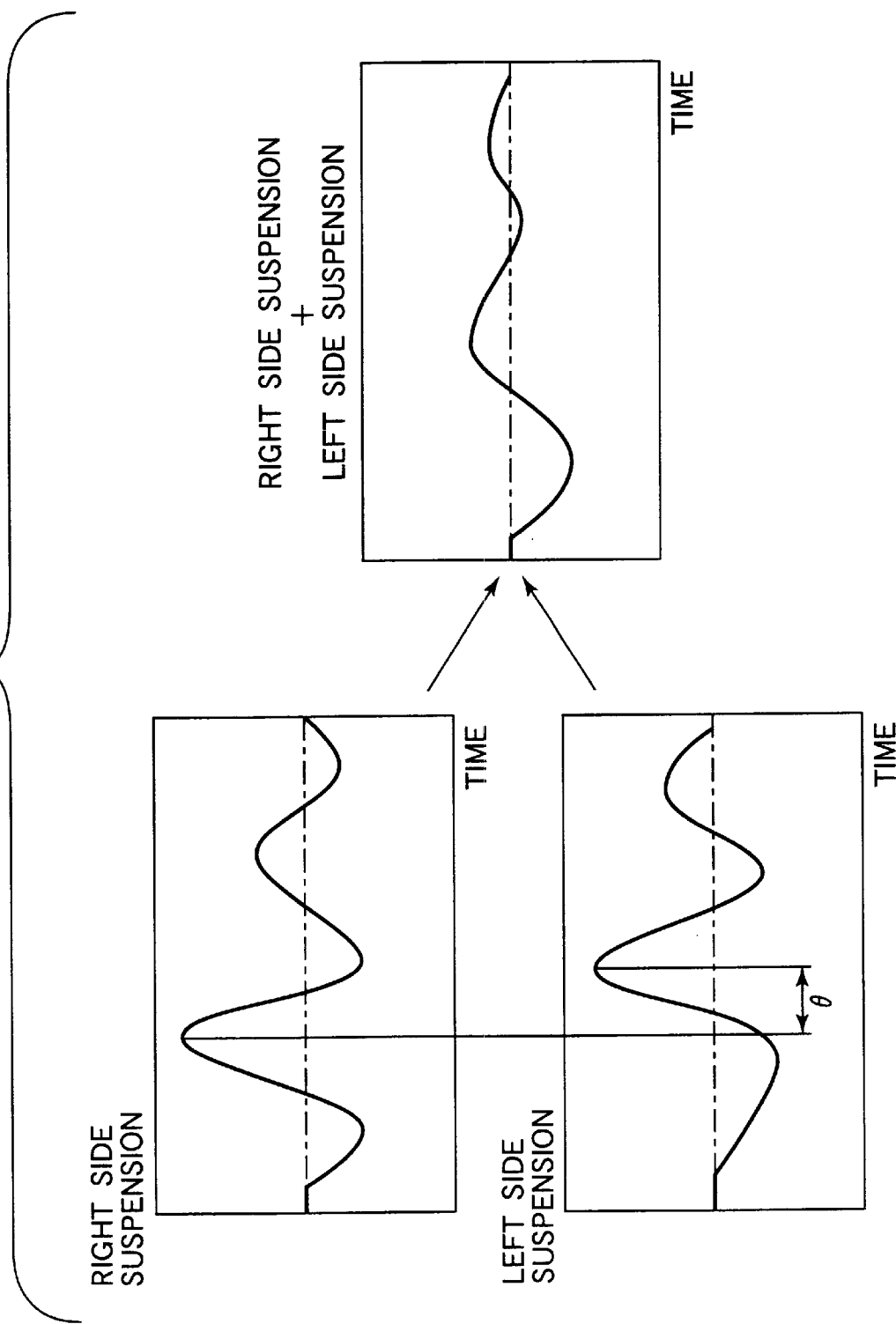

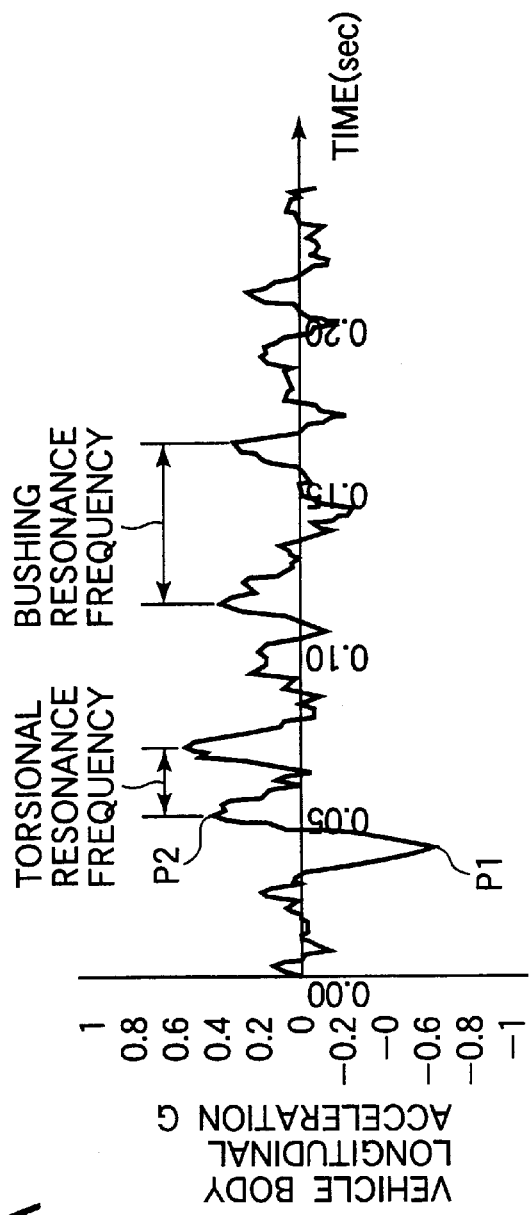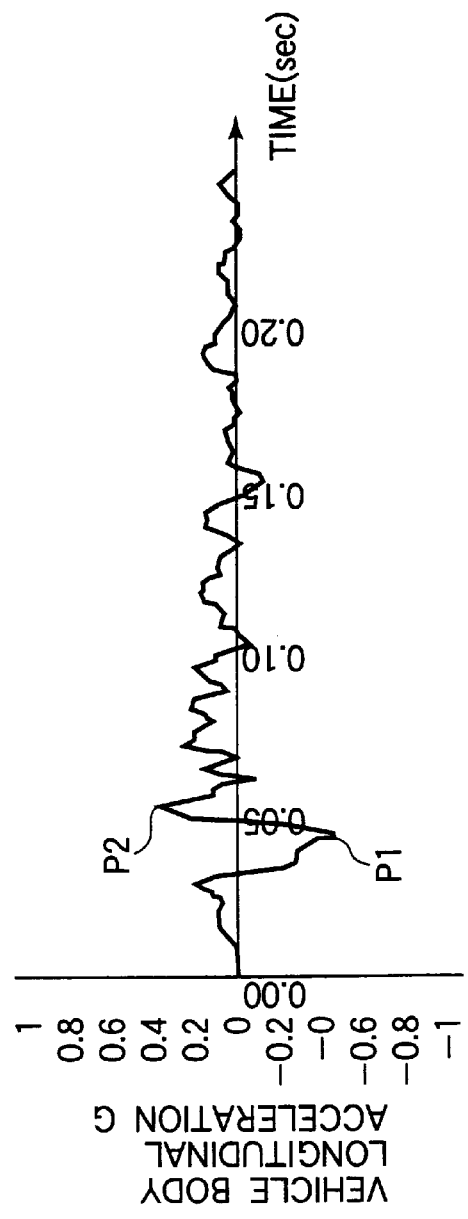
FIG.5A
FIG.5B

AUTOMOTIVE VIBRATION ISOLATING DEVICE

BACKGROUND OF THE INVENTION

1. Field of the Invention

The present invention relates to an automotive vibration isolating device comprising vibration isolating rubber members which are provided as a pair on left and right sides of an automotive vehicle.

2. Description of the Related Art

Conventionally, it is known that suspension arms of left and right suspensions of an automotive vehicle are supported on the body of the automotive vehicle via rubber bushings which are vibration isolating rubber members. In addition, known as such a rubber bushing is a rubber bushing of a sealed, fluid-filled type in which two or more fluid chambers are formed in a rubber element which communicate with each other via orifice portions, whereby viscous resistance generated when filled and sealed fluid flows between said fluid chambers via the orifice portions provides a damping action of vibrations. Note that the same specification is used for rubber bushings used on the left and right suspensions of the automotive vehicle.

When an automotive vehicle is running on the surface of a road from which the automotive vehicle picks up pulse-like inputs (or a road having joints in the surface thereof), a longitudinal vibration force is transmitted from the road surface to the vehicle body via the left and right suspensions of the vehicle. This vibration force is a resultant force from vibrations deprived from longitudinal resonance of unspring members caused by the resiliency of rubber bushings whose masses are unsprung loads (hereinafter, referred to as bushing resonance) and vibrations deprived from longitudinal oscillations of the suspensions caused by resonance in directions of torsion of the tires (hereinafter referred to as tire torsion resonance) FIG. 6 shows a power spectrum of the longitudinal vibration force transmitted to the vehicle body, and in the graph, a portion designated by reference character "a" whose frequency is around 19 Hz is deprived from the bushing resonance, while a portion designated by reference character "b" whose frequency is around 45 Hz is deprived from the tire torsion resonance.

Here, in order to reduce the longitudinal vibration force that is transmitted to the vehicle body, it is considered to set low the spring constant of the rubber bushings, but this results in the deterioration of steering stability such as the bad response of the vehicle body when steered, and the countermeasure is not practical.

SUMMARY OF THE INVENTION

The present invention was made in view of the above situations, and an object thereof is to provide an automotive vibration isolating device for effectively reducing vibration that is transmitted to the body of an automotive vehicle.

With a view to solving the problem, according to the invention, there is provided an automotive vibration isolating device, including a pair of vibration isolating rubber members provided on left and right sides of an automotive vehicle and having a difference in dynamic characteristics between one and the other of said vibration isolating rubber members. Here, in a case where the vibration isolating rubber members are of a sealed, fluid-filled type, there is provided a difference in dynamic characteristics, which are vibration damping characteristics provided by fluid filled and sealed in the vibration isolating rubber members, between the one and the other of the pair of left and right vibration isolating rubber members. Preferably, a vibration frequency ratio between the and the other of the pair of left and right vibration isolating rubber members in which the rubber members provide maximum damping is 1.5 or more.

According to the invention, there is caused a difference in phase between the vibration transmitted via the one of the pair of left and right vibration isolating rubber member and the vibration transmitted via the other of the same, whereby the vibration transmitted via the one vibration isolating rubber member and the vibration transmitted via the other vibration isolating rubber member cancel each other, the vibration force that is transmitted to the vehicle body being thereby reduced effectively.

BRIEF DESCRIPTION OF THE DRAWINGS

FIG. 4 is a view showing a principle of an operation of reducing vibration of the body of an automotive vehicle;

FIG. 5A is a graph showing the result of an actual measurement of the longitudinal acceleration of the vehicle body when the vibration damping characteristics of the rubber bushings the left and right suspensions are set identical;

FIG. 5B is a graph showing the result of an actual measurement of the longitudinal acceleration of the vehicle body when there is provided a difference in vibration damping characteristics between the rubber bushings for the left and right suspensions.

DETAILED DESCRIPTION OF THE PREFERRED EMBODIMENTS

Figure 1:
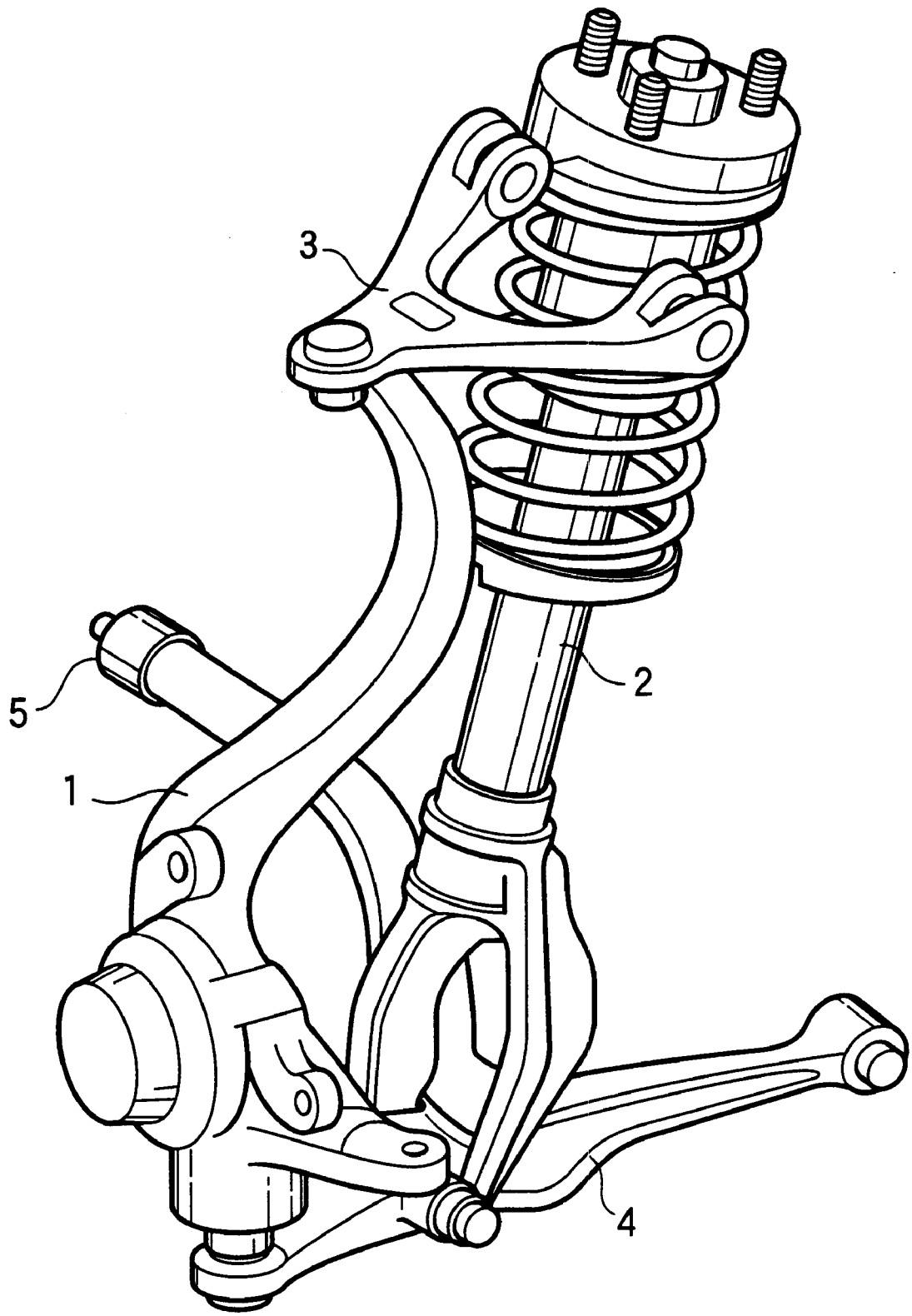
FIG. 1 is a perspective view of a suspension provided with a suspension rubber bushing which is a vibration isolating rubber member according to an embodiment of the invention.

FIG. 1 shows a suspension for an automotive vehicle. This suspension is a double-wishbone-type suspension comprising a steering knuckle 1 for rotatably supporting a wheel (not shown), a damper 2, an upper control arm 3 coupled to an upper end portion of the steering knuckle 1 and a lower control arm 4 coupled to a lower end portion of the steering knuckle 1. The lower control arm 4 is formed into substantially an L-shape, and a rubber bushing 5 which is a vibration isolating rubber member is mounted on a front end portion of the lower control arm 4. Then, the rubber bushings 5 are provided as a pair on left and right sides of an automotive vehicle by providing the suspensions on the left and right sides thereof.

Figure 2A:
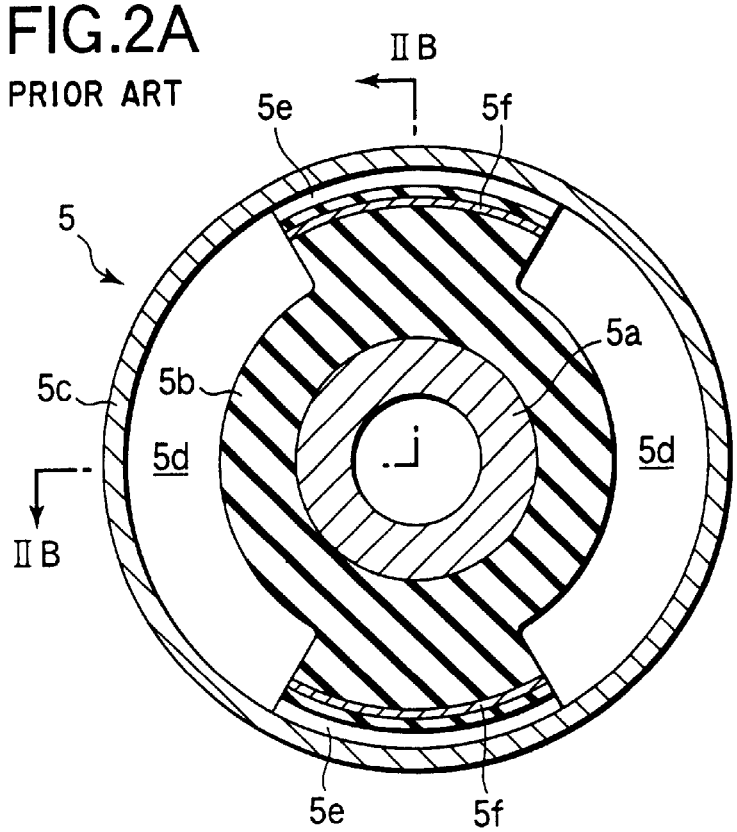
FIG. 2A is a cross-sectional view of the suspension rubber bushing.
Figure 2B:
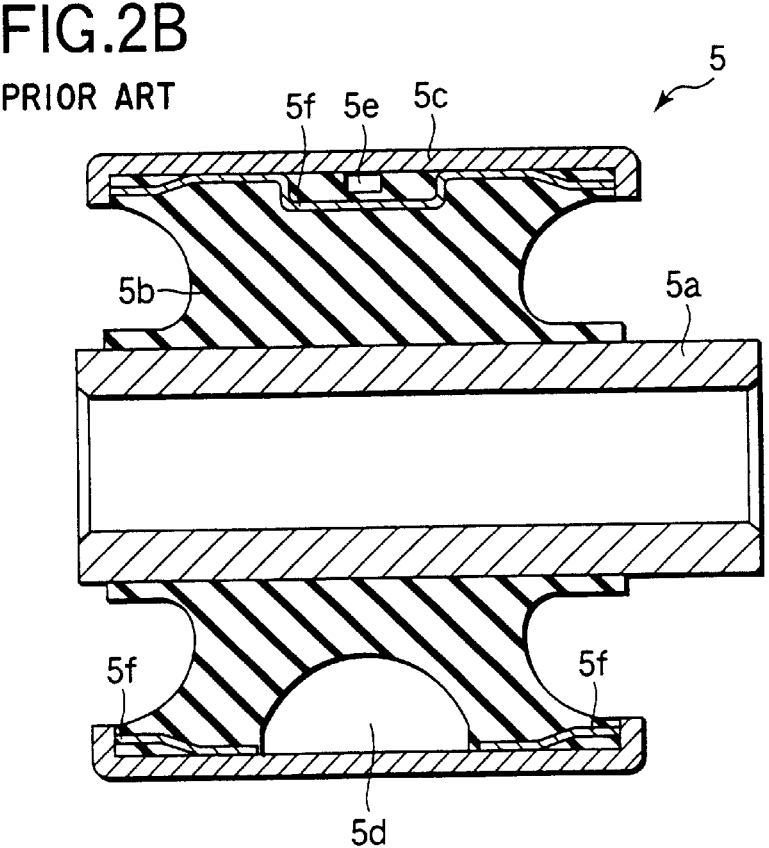
FIG. 2B is a longitudinal cross-sectional view taken along the line IIB—IIB of FIG. 2A.

The rubber bushing 5 comprises, as shown in FIGS. 2A, 2B, a metallic inner cylinder 5a, a rubber element 5b secured to an outer circumference of the inner cylinder 5a and a metallic outer cylinder 5c secured to an outer circumference of the rubber element 5b. A longitudinally elongated shaft portion (not shown) provided so as to protrude from the front end of the lower control arm 4 is inserted into the inner cylinder 5a, and the outer cylinder 5c is fastened to a sub-frame of the vehicle body, whereby the front end of the lower control arm 4 is elastically supported in such a manner as to rotate around and to be displaced in longitudinal, vertical and transverse directions relative to the shaft portion, respectively. Here, when the wheel is displaced in longitudinal directions relative to the vehicle body, the front end portion of the lower control arm 4 is displaced in transverse directions.

Then, in order to damp the vibration of the front end portion of the lower control arm 4 in transverse directions, the rubber bushing 5 is constructed as a rubber bushing of a sealed, fluid-filled type having fluid chambers 5d, 5d along left and right side circumferential surface portions of the rubber element 5b, respectively. The two fluid chambers 5d, 5d are allowed to communicate with each other via orifice portions 5e, 5e formed above and below the rubber element 5b. A vibration damping operation is carried out by viscous resistance generated when fluid filled and sealed in the rubber bushing flows between the two fluid chambers 5d, 5d via the orifice portions 5e. Note that a metal insert 5f is embedded so as to be positioned on the inside of the orifice portion 5e for preventing the collapse thereof.

Figure 3:
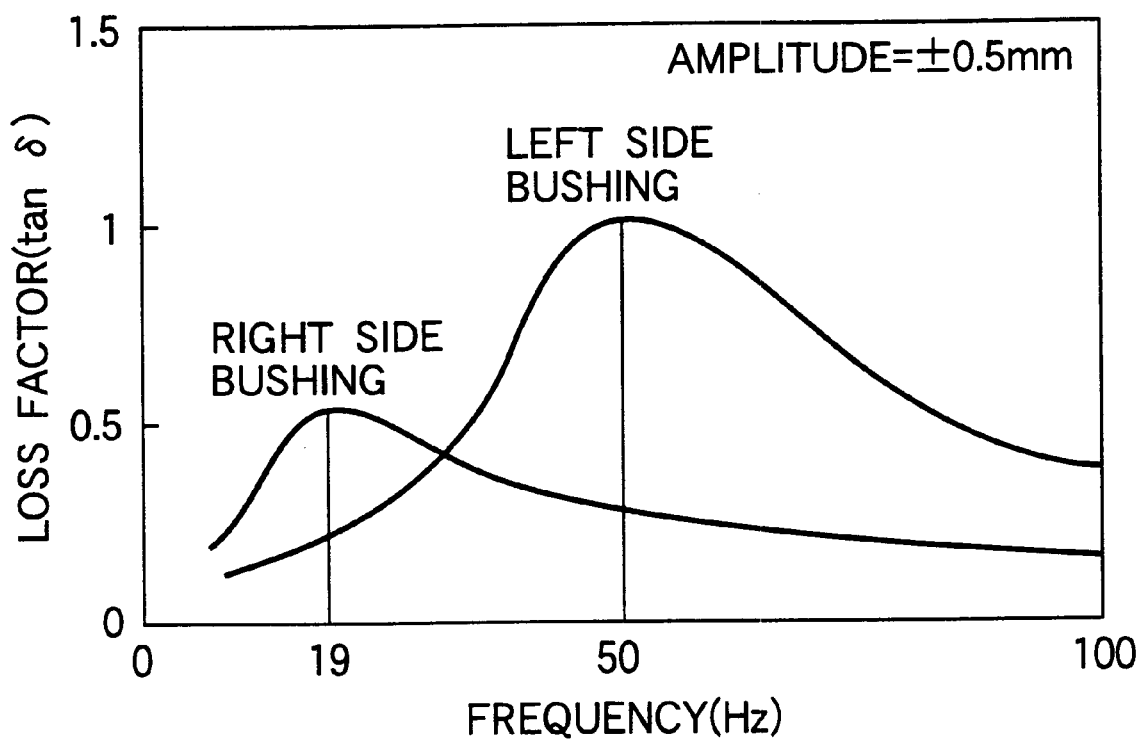
FIG. 3 is a graph showing vibration damping characteristics of rubber bushings for left and right suspensions.
Figure 6:
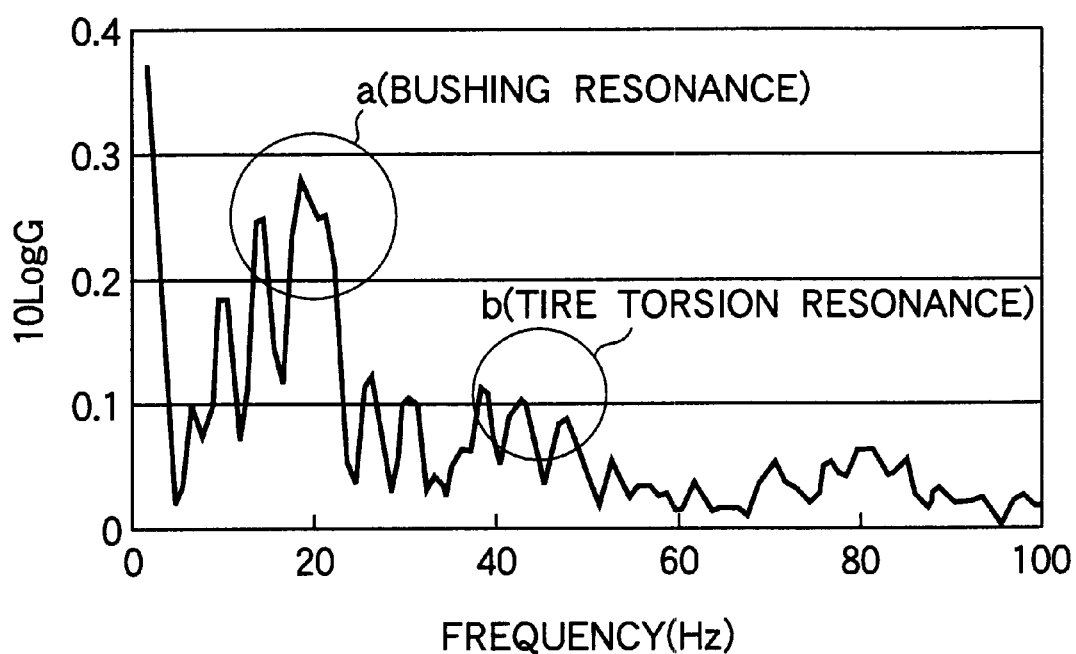
FIG. 6 is a graph showing the power spectrum of the longitudinal vibration of the vehicle body.

In the construction described above, in order to have a difference in dynamic properties of the rubber bushing 5 which are vibration damping properties provided by the filled and sealed fluid between rubber bushings for left and right side suspensions, the cross-sectional areas and lengths of the orifice portions 5e of the left and right side rubber bushings are set different from each other, and a vibration frequency ratio between the rubber bushings for the left and right side suspensions in which the rubber bushings provide maximum damping is set to be 1.5 or more. For example, as shown in FIG. 3, a vibration frequency in which a loss factor (the tangent of a loss angle δ between stress and distortion) for the rubber bushing for the right side suspension is maximum, which is a parameter representing damping, is 19 Hz which is close to the frequency of the vibration deprived from the bushing resonance, and a vibration frequency in which a loss factor for the rubber bushing for the left side suspension is maximum, is 50 Hz which is close to the frequency of the vibration deprived from the tire torsion resonance. Note that the spring constant of the rubber element 5b of the rubber bushing 5 is 300 N/mm for both the left and right bushings.

With the different vibration damping properties being provided for the left and right rubber bushings, even if pulse-like inputs are inputted in an automotive vehicle which is running on a road having an irregular or jointed surface from the left and right wheels thereof simultaneously, as shown in FIG. 4, there is occurring a difference θ in phase between vibration transmitted to the body of the automotive vehicle via the right side suspension and vibration transmitted to the vehicle body via the left side suspension, and the vibrations from the left side and right side suspensions cancel with each other, whereby the vibration of the vehicle body is reduced.

FIGS. 5A and 5B show the results of actual measurements of longitudinal acceleration (G) of the vehicle body when the pulse-like inputs were inputted from the left and right wheels simultaneously. FIG. 5A shows a case where the vibration frequencies of the rubber bushings for the right side and left side suspensions in which the rubber bushings provide a maximum loss factor were both set at 30 Hz, while FIG. 5B shows a case where the same vibration frequencies were set as shown in FIG. 3. When compared with the former case, with the latter case, the acceleration (G) at a first peak P1 and a second peak P2 was reduced by about 30%, and the acceleration (G) at peaks occurring thereafter was reduced to about the half of the peaks in the former case.

Thus, while the embodiment has been described heretofore in which the invention is applied to the rubber bushings 5 for the respective left side and right side suspensions, the invention may be applied widely to vibration isolating rubber members which are provided as a pair on left and right sides of an automotive vehicle. For example, vibrations caused by inputs from the wheels can be reduced by having a difference in dynamic characteristics between left and right rubber mounts for dampers which are provided at connecting portions to the vehicle body at upper ends of the dampers or between left and right rubber mounts for a sub-frame which are provided at connecting portions to the vehicle body of the sub-frame. In addition, a shock feeling felt when the vehicle starts can also be reduced by having a difference in dynamic characteristics between left and right rubber mounts for an engine or transmission for a longitudinal engine.

While only certain embodiments of the invention have been specifically described herein, it will apparent that numerous modifications may be made thereto without departing from the spirit and scope of the invention.

As is clear from what has been described heretofore, according to the invention, the vibration force transmitted to the vehicle body can be reduced by having a difference in phase between the vibration transmitted via one of the left and right vibration isolating rubber members and the vibration transmitted to the vehicle body via the other vibration isolating rubber member.

What is claimed is:

1. An automotive vibration isolating device, comprising:
   a pair of vibration isolating rubber members provided on left and right wheel suspension components of an automotive vehicle and having a difference in dynamic characteristics between one and the other of said vibration isolating rubber members.

2. The automotive vibration isolating device according to claim 1, wherein said vibration isolating rubber members are of a sealed, fluid-filled type, and wherein said dynamic characteristics are vibration damping characteristics provided by fluid filled and sealed in said vibration isolating rubber members.

3. The automotive vibration isolating device according to claim 2, where in a vibration frequency ratio between said one and the other of said left and right vibration isolating rubber members in which said rubber members provide maximum damping is 1.5 or more.

4. The automotive vibration isolating device according to claim 1, wherein said vibration isolating rubber members are rubber bushings for said right and left suspension components.

5. The automotive vibration isolating device according to claim 4, wherein each of said rubber bushings comprises:
   a metal inner cylinder supporting a shaft portion of a lower arm being a part of the suspension;
   a metal outer cylinder fastened to a sub-frame of the automotive vehicle; and
   a rubber element disposed between said inner and outer cylinders,
   wherein said outer cylinder and said rubber element define a pair of fluid chambers sealed with fluid therebetween so as to provide the vibration damping characteristic.

* * * * *